United States Patent [19]
Nishigaki et al.

[11] Patent Number: 6,020,719
[45] Date of Patent: Feb. 1, 2000

[54] SECONDARY BATTERY UNIT USING ELECTRIC DOUBLE LAYER CONDENSER

[75] Inventors: Eitaro Nishigaki; Yasuhei Shimada, both of Tokyo, Japan

[73] Assignee: NEC Corporation, Tokyo, Japan

[21] Appl. No.: 09/189,272

[22] Filed: Nov. 6, 1998

[30] Foreign Application Priority Data

Nov. 12, 1997 [JP] Japan .................................. 9-310868

[51] Int. Cl.$^7$ ................................................ H01M 10/46
[52] U.S. Cl. .................................................... 320/128
[58] Field of Search ................................. 320/103, 104, 320/125, 126, 127, 128, 140, 163, 166; 323/208, 209, 210; 363/125, 126, 127, 128

[56] References Cited

U.S. PATENT DOCUMENTS

| | | | |
|---|---|---|---|
| 4,904,923 | 2/1990 | Zucker | 323/340 |
| 5,723,913 | 3/1998 | Weggel | 363/132 X |

FOREIGN PATENT DOCUMENTS

| | | |
|---|---|---|
| 7-87687 | 3/1995 | Japan . |
| 8-168182 | 6/1996 | Japan . |
| 9-93809 | 4/1997 | Japan . |

*Primary Examiner*—Edward H. Tso
*Attorney, Agent, or Firm*—Scully, Scott, Murphy and Presser

[57] ABSTRACT

A secondary battery unit which can supply constant power for a longer time with a lower input voltage and which is small, light, and suitable for portable use is provided. The secondary battery unit comprises plural inductors having different inductances, to which the first voltage is input; a rectifier inserted between the plural inductors and the output terminal; plural switches respectively connected to the plural inductors, each switch making current according to the first voltage flow through the connected inductor when the switch is operated; a switching controller for selectively operating one of the plural switches according to variation of the first voltage; and a controller for controlling timing of the above switching between the plural switches so as to stabilize a voltage from the output terminal to the predetermined second voltage.

6 Claims, 14 Drawing Sheets

SECONDARY BATTERY UNIT USING ELECTRIC DOUBLE LAYER CONDENSER

BACKGROUND OF THE INVENTION

1. Field of the Invention

The present invention relates to an electric power source using an electric double layer condenser as a secondary battery and, in particular, to a technique for improving energy-using efficiency related to the electric double layer condenser.

This application is based on Patent Application No. Hei 9-310868 filed in Japan, the contents of which are incorporated herein by reference.

2. Description of the Related Art

Conventional electric devices using a battery-type power source have an advantage of superior portability in comparison with devices using a commercially-available power source. In particular, using a secondary battery has a remarkable effect of recycling the battery.

However, such a secondary battery has a disadvantage that a considerable charge time is necessary. Generally, for example, about one hour is necessary even for a quick charge. Regarding uses which consume large current, the time necessary for charging the battery may be longer than the usage time of the device. If a quick charge is adopted for reducing the charge time, the heating value of the battery is increased and the life thereof is reduced. Therefore, reduction of the charge time has a limit.

In consideration of the above problem, an electric double layer condenser has received much attention recently as another chargeable power source. The electric double layer condenser has a feature in which when an electronic conductive material is in contact with an electrolytic solution, an electric double layer is generated at an interface, and electric charge is stored in the double layer as electrostatic charge. According to the electric double layer condenser, capacity remarkably greater than that obtained by a ceramic condenser or an aluminum electrolytic condenser can be obtained, for example, an electric double layer condenser having 200 F. at 12 V (withstanding voltage) and volume of approximately 6,100 cc is known. In addition, no chemical reaction is generated at the time of charging or discharging; thus, life-time capability with respect to the cycle of charge/discharge is excellent and performance of the battery is hardly degraded under normal usage conditions. Furthermore, the charging operation can be performed using a large amount of current; thus, a charge time of the order of only seconds or minutes is necessary. Therefore, in comparison with an ordinary secondary battery, the electric double layer condenser can greatly reduce the charge time.

Accordingly, a combination of such an electric double layer condenser and a DC-DC converter (i.e., a switching regulator) has been experimentally manufactured so as to perform an operation similar to that of the secondary battery. For example, Japanese Patent Application, First Publication, Nos. Hei 7-87687 (i.e., the first conventional example) and Hei 9-93809 (i.e., the second conventional example) disclose such a combination of an electric double layer condenser and a DC-DC converter (i.e., a switching regulator), which operates as a secondary battery. On the other hand, Japanese Patent Application, First Publication, No. Hei 8-168182 (i.e., the third conventional example) discloses a power supply which comprises means for switching the arrangement of electric double layer condensers from parallel connection to series connection, and which functions as a power supply employing a battery having significant voltage fluctuation.

The first conventional example will be explained with reference to FIG. 6. When power switch 64 is set to be in an on-state, power is supplied from charged electric double layer condenser 61 via switching regulator 62 to load 63. Charge terminal 65 is used at the time of charging the electric double layer condenser 61. The terminal voltage of the electric double layer condenser 61 drops in proportion to the square root of residual energy of the charge stored in the condenser. However, the switching regulator 62 acts as a DC-DC converter from which a constant voltage is output; thus, the constant voltage is output and supplied to load 63.

FIG. 7 shows relevant temporal variations of input voltage Vi and output voltage Vo of switching regulator 62. The electric double layer condenser 61 was charged with an initial voltage of 10V, and thus Vi is 10V at time 0 s (sec). As output voltage Vo of switching regulator 62, approximately 5 V is output. As power is supplied to load 63, output voltage Vo drops as time elapses. After approximately 1.4 ks, voltage Vi of electric double layer condenser 61 is less than 5V; thus, switching regulator 62 performs operation for boosting the input voltage and outputting the boosted voltage, and thus the regulator outputs a constant voltage of approximately 5V. At 1.9 ks, Vi becomes approximately 1.5 V, and after this point, output voltage Vo drops. This means that a stabilized output cannot be obtained any more because the voltage supplied to the switching regulator 62 becomes lower than the minimum input voltage. As explained above, it is understandable that the electric double layer condenser can function as a secondary battery.

Next, the above-mentioned second conventional example (refer to Japanese Patent Application, First Publication, No. Hei 9-93809) will be explained with reference to FIG. 8. Also in this example, power is supplied from an electric double layer condenser via a DC-DC converter, as the first conventional example. As a different point, an electric double layer condenser and a secondary battery are combined so that a large power can be output to a load in a short time.

The hybrid power supply as shown in FIG. 8 is used when a large power is necessary in a short period, for example, at the time of starting a motor of an electric car. At the time of supplying power, a load charged in electric double layer condenser 81 which has a high power density is converted into a constant voltage via DC-DC converter 87, and sufficient starting power is supplied to load L (i.e., motor). After the start, necessary driving power is mainly supplied from secondary battery 88. While power is supplied from electric double layer condenser 81 via the DC-DC converter 87 to load L, switch SW is maintained in an off-state, and while power is supplied from secondary battery 88 to load L, switch SW is maintained in an on-state. In this way, sufficient power can be supplied to load L from electric double layer condenser 81 via DC-DC converter 87 by switching the state of switch SW, without suffering influence of the voltage of secondary battery 88. In addition, diode 89 is provided for preventing the starting current of the motor (which was driven as load L) from flowing in reverse at the time of restarting and re-driving the motor.

Additionally, in this example, during the off-state of switch SW, the charge stored in electric double layer condenser 81 is converted into a constant voltage via DC-DC converter 87 so as to supply it to load L, as in the first conventional example.

The above-mentioned third conventional example (refer to Japanese Patent Application, First Publication, No. Hei 8-168182) will be explained with reference to FIG. 9. Electric double layer condensers C1 and C2 are previously charged to have predetermined charge levels. Output converting and adjusting circuit 91 comprises a switching device which is intermittently controlled according to pulse signals, and stabilizes voltage supplied to load 92 by using a voltage-dropping converter. In this circuit, the voltage-dropping ratio can be selected within 1/2 to 1/. Regarding switches S1–S3, switches S2 and S3 are interlocked and these switches and switch S1 are complementarily operated so as to control the on/off states of these switches according to voltage-dropping levels of charges stored in the electric double layer condensers C1 and C2. When these condensers C1 and C2 are fully charged, switch S1 is set to be off while switches S2 and S3 are set to be on, and the electric double layer condensers C1 and C2 are thus connected in parallel. When the voltage drops from a full level to 1/2 thereof, switch S1 is set to be on while switches S2 and S3 are set to be off, and the condensers C1 and C2 are thus connected in series.

FIG. 10 shows temporal variations of input voltage Vi and output voltage Vo of the output converting and adjusting circuit 91. As shown in this figure, a constant voltage is supplied to load 92 until the input voltage drops from the full voltage of electric double layer condensers C1 and C2 to 1/4 thereof.

Specifically, if the rated voltage of the load is 12 V, then as electric double layer condenser C1 and C2, those having a full voltage of 24 V are selected and used so as to obtain energy from the electric double layer condensers C1 and C2 by using the output converting and adjusting circuit 91 comprising a voltage-dropping converter. First, the electric double layer condensers C1 and C2 are fully charged and switch S1 is set to be off while switches S2 and S3 are set to be on so as to connect electric double layer condensers C1 and C2 in parallel. The output converting and adjusting circuit 91 drops the input voltage from 24 V to 12 V (i.e., 1/2 of the input level), and supplies a rated voltage of 12 V to load 92. The load 92 consumes energy, and until the terminal voltage of the electric double layer condensers C1 and C2 drops below 12 V, the output converting and adjusting circuit 91 gradually changes the voltage-dropping ratio from 1/2 to 1/1 so as to supply an electric power of a stable rated voltage of 12 V to load 92.

When approximately 75% of stored energy is output from the electric double layer condensers C1 and C2, the terminal voltage of the condensers C1 and C2 drops to 12 V. After this voltage (of 12 V) is detected, switches S2 and S3 are set to be off and then switch S1 is set to be on. In this way, the electric double layer condensers C1 and C2 are connected in series. After these operations, the voltage of 24 V is again input into the output converting and adjusting circuit 91; thus, as in a fully charged state, the circuit 91 drops the input voltage to 1/2 thereof and supplies a rated voltage of 12 V to load 92. Until approximately 20% of stored energy is output and the terminal voltage of the electric double layer condensers C1 and C2 drops to 6 V and the input voltage of the output converting and adjusting circuit 91 drops to 12 V, the circuit 91 gradually changes the voltage-dropping ratio from 1/2 to 1/1 so as to supply an electric power of a stable rated voltage of 12 V to load 92.

According to the above structure, even with an output converting and adjusting circuit which can function with the voltage-dropping ratio only within a range from 1/2 to 1/1, load 92 can be supplied with a constant voltage until the terminal voltage of electric double layer condensers C1 and C2 drops from the fully charged level to 1/4 thereof. Therefore, energy can be efficiently extracted.

However, the first problem is such that in each conventional example, the energy charged in the electric double layer condenser is not effectively used, and the period during which a relevant device is operable by a secondary battery is short. The reason for this is that the range of the input voltage of the DC-DC converter cannot be wider than the controllable range of the internal control circuit (i.e., the output converting and adjusting circuit 91 in the third conventional example), or that the input voltage cannot be lowered to a level less than the minimum operating voltage of the control circuit.

For a better understanding, the basic operation of a DC-DC converter will be explained before the problem to be solved by the present invention is explained. FIG. 11 shows the structure of an example of a conventional non-insulated boosting DC-DC converter having a simplest structure. Hereinbelow, this example will be explained for convenience of explanation.

Current IL supplied from DC power source 101 is charged into inductor 102 while switch 103 is in an on-state, and while switch 103 is in an off-state, the charge flows from inductor 102 and resonates with electrostatic capacity C, and then becomes voltage Vd, having a voltage-resonance wave form, whose peak voltage is larger than input voltage Vin of the DC power source. This voltage Vd is rectified via diode 104 and electrolytic condenser 105, and is transformed into output voltage Vout.

While diode 104 is non-conductive, the circuit is in a no-load state, and while diode 104 is conductive, an "LC" resonance circuit with load 106 connected in parallel is constructed. Strictly, the wave form of voltage Vd must be determined via simulation in this case; however, for convenience of explanation, a qualitative explanation will be given on the assumption that the resistance of load 106 can be ignored.

If the resistance of load 106 is constant, the peak of voltage-resonance wave form Vd is proportional to the peak value of current IL which flows through inductor 102 while switch 103 is on. Accordingly, if the period during which the switch 103 is on (i.e., "on-state period") is constant, when input voltage Vin of the DC-DC converter is changed, then the peak value of current IL is also changed, as shown in FIG. 12A. Therefore, as shown in FIG. 12B, the peak of voltage-resonance wave form Vd also changes in proportion to Vin.

On the other hand, if the on-state period of switch 103 is changed while Vin is maintained so as to be constant, then current IL which flows through inductor 102 is increased in proportion to the on-state period of switch 103, as shown in FIG. 12C. Therefore, as shown in FIG. 12D, the peak of voltage-resonance wave form Vd increases in proportion to the on-state period of switch 103.

Regarding the above feature, if the on-state period of switch 103 is controlled so that the peak of current IL has a constant value I1, as shown in FIG. 13A, then even if voltage Vin of DC power source 101 changes, the peak of voltage Vd can be controlled so as to have constant value V1. Output voltage Vout is obtained by rectifying the voltage Vd via diode 104 and electrolytic condenser 105; thus, the DC-DC converter can always supply a constant output voltage Vout even if input voltage Vin is changed.

Next, another operation will be explained, which is performed when the resistance of load 106 is changed and the current output from the DC-DC converter is also changed. As described above, under the influence of load 106, the voltage-resonance wave form Vd is changed owing to whether or not the diode 104 is conductive. However, so as to explain a tendency of the load to fluctuate, the voltage wave form in a state in which diode 104 is always conductive (that is, no charge is stored in electrolytic condenser 105) will be explained. FIG. 12E shows change of the voltage-resonance wave form Vd when input voltage Vin of the DC-DC converter is constant and the value of load 106 is changed. Increase of the current output from the DC-DC converter corresponds to decrease of the resistance of load 106 if output voltage Vout is constant. Therefore, as the resistance of load 106 gradually decreases from infinity, the peak voltage of wave form Vd is lowered and simultaneously the LC resonance circuit is subjected to dumping, and thereby the wave comes to have a damped-oscillating form, which converges much more quickly into the constant value Vin.

Accordingly, the control circuit for the DC-DC converter can change the onstate period of switch 103 (generally, by using the PWM (Pulse Width Modulation) control in most cases) so as to keep the peak voltage of the voltage-resonance wave form Vd constant, and thereby the constant output voltage Vout can always be supplied even if the value of the output current is changed due to fluctuation of load 106.

The above is an explanation of the basic operational principle of a conventional non-insulated boosting DC-DC converter.

Hereinbelow, a relevant control circuit will be explained in detail with reference to FIG. 14.

When the output voltage Vout from the above-explained DC-DC converter is input into feedback input terminal FB, an error between reference voltage Vref and output voltage Vout is amplified in error amplifier 109, and the amplified signal is compared in comparator 108 with a chopping wave which is generated by chopping wave oscillator 107. As a result, the duty ratio of a switching pulse output (i.e., a ratio of the width to the period of the pulse) is controlled so that the output voltage Vout equals reference voltage Vref. If the output voltage Vout is higher than reference voltage Vref, then according to the above control, the on-state period of the is switching pulse output becomes shorter and the output voltage Vout is lowered, while if the output voltage Vout is lower than reference voltage Vref, then the on-state period of the switching pulse output becomes longer and the output voltage Vout is heightened.

Generally, the frequency of the chopping wave generated in the chopping wave oscillator 107 in this control circuit is constant. The reason for using a fixed frequency is to prevent a sound generated by an inductor or a condenser used in the DC-DC converter from entering the audible range when the PWN control is performed. Generally, the selectable frequency range is 100 kHz or more and less than a few MHz. With this upper limit, switching loss is not promoted and frequency characteristics of the inductor and condenser are not degraded.

In addition, it is difficult to make the on-state period of the switching transistor 90% or more because the current-emission period of the inductor must be considered, though the on-state period is also influenced by the load situation. Therefore, within the on-state period of less than 90%, the change of the peak of the voltage-resonance wave form of the inductor due to fluctuations of the load and the input voltage must be controlled. According to a general design condition, when the load current is maximum at the minimum operating voltage of the DC-DC converter, the on-state period of the switching transistor becomes maximum.

Therefore, according to the control, as the input voltage increases and as the load current decreases, the on-state period of the switching transistor becomes shorter.

Many recent devices having electronically-improved characteristics hardly consume energy in an unused and standby state for saving energy. This means that the situation of the DC-DC converter changes tremendously from an almost no-load situation to a situation for supplying maximum output. In such usage, the on-state period of the switching transistor is allocated to load fluctuation, and thus cannot be used for absorbing the input-voltage range.

In a case such as the present invention in which energy stored in the electric double layer condenser is used, if the range of the input voltage of the DC-DC converter doubles, then only 75% of the stored energy can be used. This is because the energy necessary for charging the condenser is proportional to the square of the voltage; thus, when the charged voltage is halved, the residual energy in the condenser becomes one-fourth. In such a DC-DC converter having double the input-voltage range, 25% of the energy stored in the condenser cannot be used; thus, the operable time of a relevant device is shorter and usage is restricted with an undesirable condition that the range of load fluctuation is narrow.

As explained above, the DC-DC converter converts input energy into current energy via an inductor so as to perform power control; thus, the possible ranges of input voltage and load fluctuation which can be followed are restricted.

Additionally, so as to operate the secondary battery unit as long as possible by effectively using the charge stored in the electric double layer condenser, the DC-DC converter should be driven with a lower input voltage. However, the control circuit for controlling the operation of the DC-DC converter has a limit for the input-voltage range necessary for normal operation. Regarding a popular circuit using a bipolar transistor, approximately 0.7 V is necessary between the base and the emitter. On the other hand, a band-gap reference circuit is generally used so as to prevent the control circuit from having a temperature (variable) characteristic. However, approximately 1.26 V is necessary for this circuit; thus, input voltage of at least 2 to 3 V is necessary for constructing the control circuit. A circuit using a MOS transistor also has necessary minimum input voltage. Therefore, unless the control circuit is operated using an auxiliary power supply, the DC-DC converter cannot be activated below the above input voltage.

Accordingly, the lower side of the voltage charged in the electric double layer condenser, that is, the voltage obtained near the termination of discharge is insufficient for operating the DC-DC converter. On the other hand, when initial voltage charged in the electric double layer condenser is increased so as to improve the availability of the charged energy, if the possible range for following the load fluctuation is widened, a desirable input-voltage range cannot be realized due to the restriction of the above-mentioned PWM controlled range.

Furthermore, if the control circuit is operated near the minimum voltage, the efficiency of the DC-DC converter may be lowered. The reason for this follows. A switch of MOS transistor type is generally used in the control circuit, and when the gate voltage of the transistor is lowered to a few volts, the on-state resistance between the drain and the source is increased because the square of the gate voltage is proportional to the drain current, and thus loss is caused by current flowing through the inductor.

In the above third conventional example, the connection of the condensers is switched from parallel to series when the charge in the condensers is used. If MOS transistors are used for switches S1–S3 for the switching operation, loss is caused by the on-state resistance of the MOS transistors. In particular, if the source line is switched as in the third conventional example, there is a disadvantage in which loss is increased due to a large amount of current.

As described above, in the conventional techniques, the energy stored in the electric double layer condenser is not efficiently used, and a possible period for operating a device by using the electric double layer condenser as a secondary battery is short. This is a first problem.

The second problem is that the conventional techniques do not suit miniaturization because according to the third conventional example, two electric double layer condensers and three switches are necessary and thus the physical form has a large size. The electric double layer condenser is the part having the largest physical size, and regarding the switch, a power transistor is necessary because a large current flows through the switch. Accordingly, uses as a secondary battery are restricted.

SUMMARY OF THE INVENTION

In consideration of the above circumstances, the present invention relates to a secondary battery unit for receiving a charge from a previously-charged electric double layer condenser and outputting constant power via a DC-DC converter, and an object of the present invention is to provide a secondary battery unit in which the DC-DC converter has a wider range of the input voltage; which allows a wider range of load fluctuation; which can supply constant power for a longer time, by operating a control circuit, even at voltages lower than the minimum operating voltage of the control circuit; and which is small, light, and suitable for portable use.

Therefore, the present invention provides a secondary battery unit for converting a first voltage to a predetermined second voltage and outputting the second voltage from an output terminal, the first voltage being a terminal voltage of an electric double layer condenser which is previously charged to have a predetermined voltage by using a detachable charge circuit, the unit comprising: plural inductors having different inductances, to which the first voltage is input; rectifying means inserted between the plural inductors and the output terminal; plural switching means respectively connected to the plural inductors, each switching means making current according to the first voltage flow through the connected inductor when the switching means is operated; switching control means for selectively operating one of the plural switching means according to variation of the first voltage; and a control circuit for controlling timing of the above switching between the plural switching means so as to stabilize a voltage from the output terminal to the predetermined second voltage.

In the secondary battery unit, as the first voltage is gradually lowered from the higher side, the switching control means typically controls the plural switching means so as to switch one of the plural inductors having a larger inductance to another inductor having a smaller inductance.

The present invention also provides a similar secondary battery unit comprising: a transformer having primary and secondary windings, the primary winding having plural taps for changing the number of turns of the primary winding, and the first voltage being input into the primary winding; rectifying means inserted between the secondary winding of the transformer and the output terminal; plural switching means respectively connected to the plural taps, each switching means making current according to the first voltage flow through the winding having the number of turns determined by the connected tap when the switching means is operated; switching control means for selectively operating one of the plural switching means according to variation of the first voltage; and a control circuit for controlling timing of the above switching between the plural switching means so as to stabilize a voltage from the output terminal to the predetermined second voltage.

In this secondary battery unit, as the first voltage is gradually lowered from the higher side, the switching control means typically controls the plural switching means so as to switch one of the plural taps corresponding to a larger number of turns to another tap corresponding to a smaller number of turns.

In the above secondary battery units, the control circuit is typically operated with the second voltage as a source voltage.

According to the present invention, an allowable range with respect to fluctuation of the terminal voltage of the electric double layer condenser can be wider in comparison with the conventional case, and thus it is possible to output a constant voltage for a longer time also in comparison with the conventional case.

In addition, miniaturization of the unit can also be realized according to the present invention.

BRIEF DESCRIPTION OF THE DRAWINGS

FIGS. 12A and 12C show relationships between the current flowing through the inductor and time with respect to the conventional DC-DC converter, while

FIG. 13A shows the current flowing through the inductor when the peak thereof is kept constant with respect to the conventional DC-DC converter, while

DESCRIPTION OF THE PREFERRED EMBODIMENTS

Hereinbelow, an embodiment according to the present invention will be explained with reference to the drawings.

Figure 1:
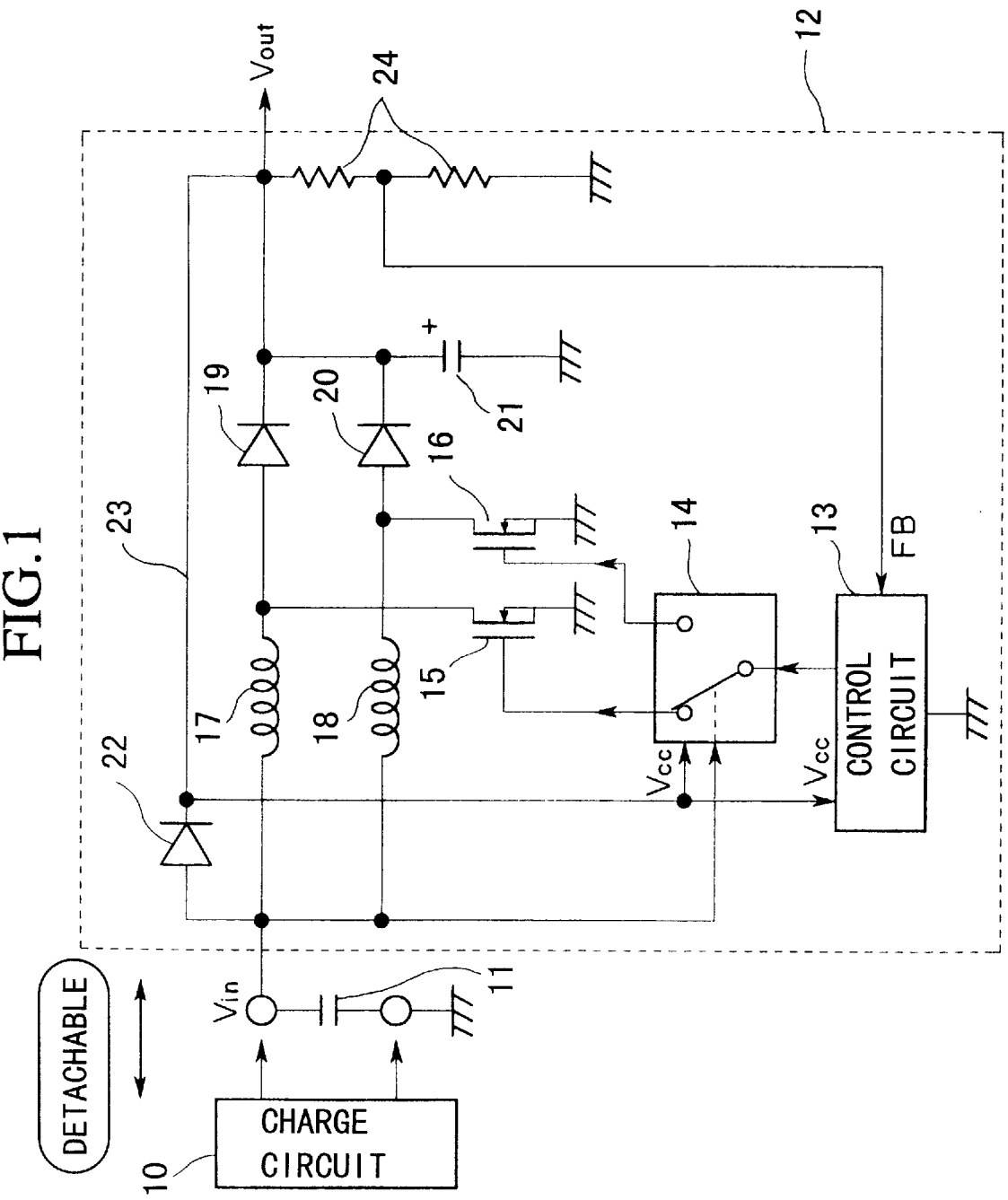
FIG. 1 is a block diagram showing the construction of a secondary battery unit as an embodiment according to the present invention.

FIG. 1 is a block diagram showing a structure of a secondary battery unit as an embodiment according to the present invention. In this figure, charge circuit 10 has a detachable form, and is connected to DC-DC converter 12 with electric double layer condenser 11. The DC-DC converter 12 is called a "boosting" type and has a function of boosting an input voltage and outputting a higher voltage. The control circuit 13 controls the boosting DC-DC converter 12. In this control circuit, the first switching transistor 15 or the second switching transistor 16 is driven so as to control current flowing through the first inductor 17 or the second inductor 18. This current is rectified via the first diode 19 or the second diode 20, and via smoothing condenser 21, and consequently, constant DC output voltage Vout is output. Inductor-switching controller 14 performs a switching operation between the first inductor 17 and the second inductor 18 by choosing between the first switching transistor 15 or the second switching transistor 16 according to the level of input voltage Vin. Specifically, when the electric double layer condenser 11 is discharged and the input voltage Vin is lowered from the higher side to a predetermined level, one of the inductors having a larger inductance is switched to another inductor having a smaller inductance.

In addition, reference numeral 22 indicates a diode for preventing reverse-current, reference numeral 23 indicates a feedback line, and reference numeral 24 indicates a voltage divider.

Operations of the secondary battery unit having the above structure will be explained below.

First, after electric double layer condenser 11 is charged by charge circuit 10, this circuit 10 is detached, and thereby charge in the electric double layer condenser 11 is supplied to DC-DC converter 12. The input voltage double layer condenser 11 is detected by inductor-switching controller 14 in the DC-DC converter 12.

Figure 2:
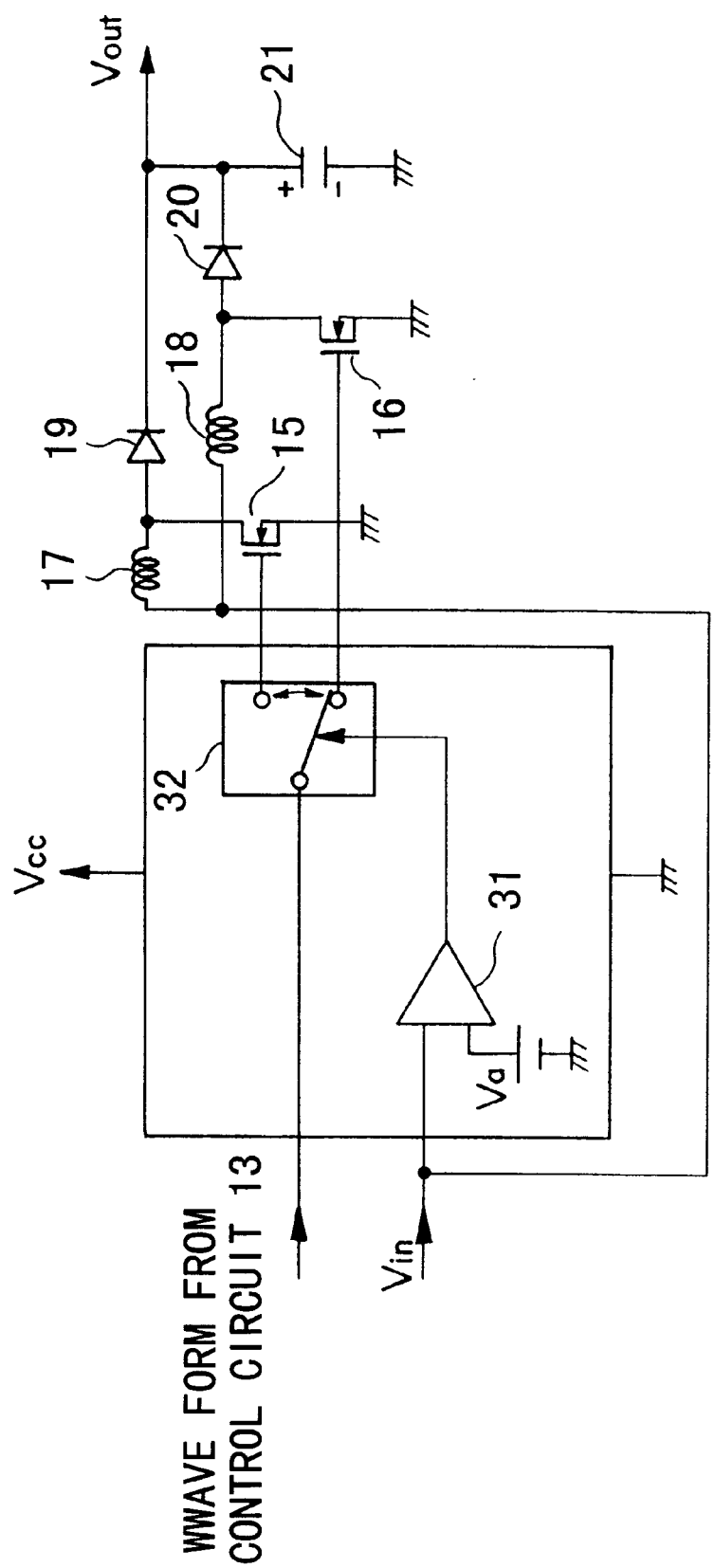
FIG. 2 is a circuit diagram showing the construction of the inductor-switching controller in the secondary battery unit of FIG. 1.

FIG. 2 shows the internal structure of inductor-switching controller 14. The switching controller 14 inputs the input voltage Vin from the electric double layer condenser 11 into comparator 31 so as to compare it with voltage Va for switching the inductor, and outputs a result of comparison to switch 32. The result from comparator 31 and a pulse-driving wave form from the control circuit 13 are input into switch 32, and accordingly, one of the first switching transistor 15 and the second switching transistor 16 is chosen. If the first switching transistor 15 is chosen, the first inductor 17, the first diode 19, and the smoothing condenser 21 construct the boosting DC-DC converter 12, while if the second switching transistor 16 is chosen, the second inductor 18, the second diode 20, and the smoothing condenser 21 construct the boosting DC-DC converter 12. That is, according to the level of the input voltage Vin, one of the two kinds of boosting DC-DC converters is operated by switching.

Figure 3:
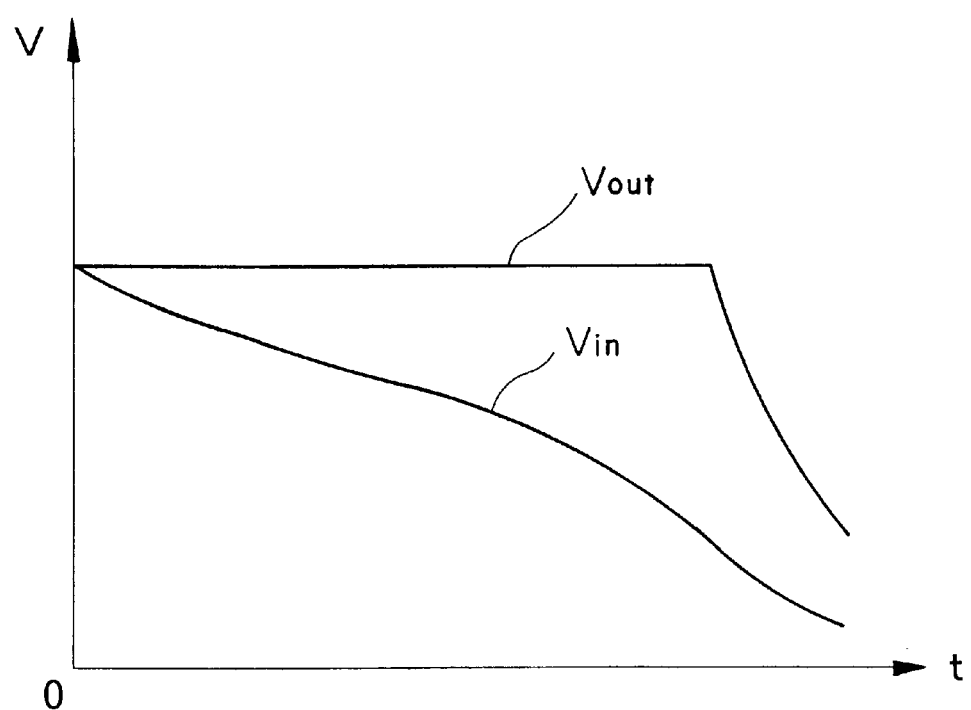
FIG. 3 shows temporal variations of the input voltage and the output voltage of the secondary battery unit of FIG. 1.

FIG. 3 shows temporal variations of input voltage Vin and output voltage Vout of the above secondary battery unit. In this figure, output voltage Vout has a constant value, and a secondary battery as a combination of electric double layer condenser 11 and DC-DC converter 12 is equivalently constructed. On the other hand, input voltage Vin is gradually decreased. In the secondary battery unit in the present embodiment, while input voltage Vin is higher than the above switching voltage Va, the inductor having a larger inductance is used, and when the input voltage Vin is lowered below Va, the inductor is switched to that having a smaller inductance. The reason for this follows.

Electromagnetic energy P stored when current I flows through an inductor having inductance L is represented by the following equation (1).

$$P = 1/2 \cdot L I^2 \qquad (1)$$

When a DC voltage V is applied to the inductor for time t, current I through the inductor is represented as follows.

$$I = t \cdot V / L \qquad (2)$$

By substituting equation (2) into (1), the following equation (3) can be obtained.

$$P = t^2 V^2 / 2L \qquad (3)$$

That is, electromagnetic energy P stored in the inductor is proportional to the square of applied voltage V and time t.

However, as described above, the switching frequency of DC-DC converter 12 is constant; thus, time t is restricted and cannot be longer than a specified value. Therefore, on the assumption that time t is fixed in equation (3), if voltage V is lowered by half, electromagnetic energy P stored in the inductor is decreased and output voltage Vout of the DC-DC converter 12 is also lowered unless inductance L is lowered to one-fourth.

Accordingly, the switching operation of the inductor according to the input voltage Vin is effective for realizing operations under large load fluctuation which can hardly be controlled by control circuit 13 of DC-DC converter 12 or under input voltage Vin having a wider range.

As a concrete example of switching the inductor, it is assumed that electric double layer condenser 11 is charged to have 5V by charge circuit 10, and a constant output voltage of 5V is obtained via DC-DC converter 12. It is also assumed that the inductance of the first inductor 12 is larger than that of the second inductor 18. Until input voltage Vin from electric double layer condenser 11 is lowered from 5V to the predetermined switching voltage Va, according to the operation of inductor-switching controller 14, the DC-DC converter 12 consisting of the first inductor 17, the first diode 19, the first switching transistor 15, smoothing condenser 21, and control circuit 13 is operated, and output voltage Vout of 5V is output.

On the other hand, when the input voltage Vin of the electric double layer condenser 11 is lowered below the predetermined voltage Va, according to the operation of inductor-switching controller 14, the DC-DC converter 12 consisting of the second inductor 18, the second diode 20, the second switching transistor 16, smoothing condenser 21, and control circuit 13 is operated. After that, terminal voltage Vin of the electric double layer condenser 11 is continuously decreased, and output voltage of 5V is output until control circuit 13 becomes inoperable due to insufficiency of input source voltage.

Figure 14:
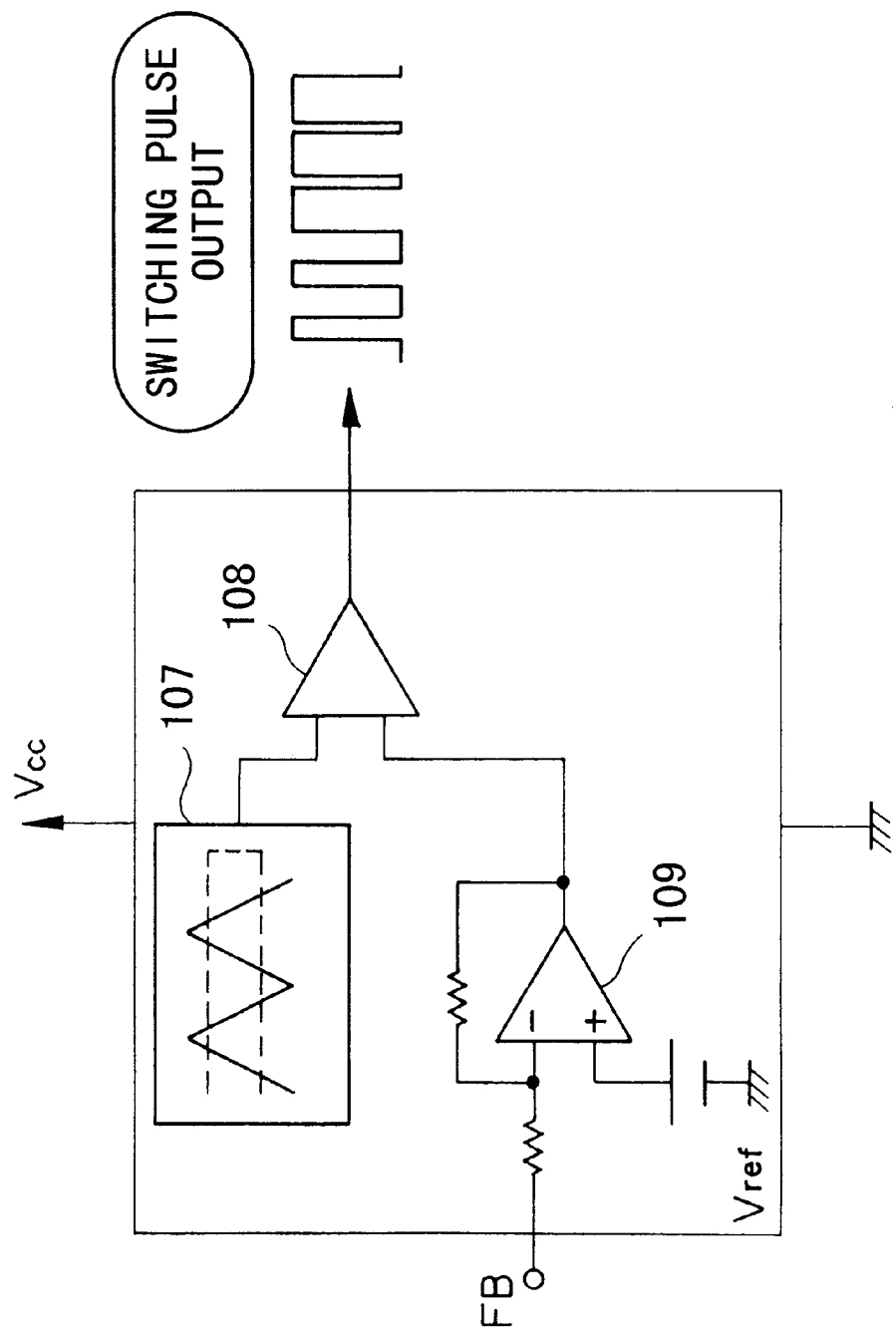
FIG. 14 is a block diagram showing the construction of a conventional control circuit.

The output voltage Vout is further input into source terminal Vcc of control circuit 13 via feedback line 23. The internal structure of control circuit 13 is similar to that explained above with reference to FIG. 14. When output voltage Vout is input into feedback terminal FB of control circuit 13, an error between this output voltage Vout and reference voltage Vref is amplified by error amplifier 109, and then the error is compared by comparator 108 with a chopping wave generated by chopping wave generator 107. As a result, the duty ratio of the switching pulse output (i.e., a ratio of the width to the period of the pulse) is controlled so that the output voltage Vout equals the reference voltage Vref. If the output voltage Vout is higher than the reference voltage Vref, the on-state period of the switching pulse output becomes shorter and output voltage Vout is lowered in the operation. On the other hand, if the output voltage Vout is lower than the reference voltage Vref, the on-state period of the switching pulse output becomes longer and output voltage Vout is heightened in the operation. In this operation, even if input voltage Vin is lowered, a boosted and constant source voltage Vcc is supplied to control circuit 13; thus, switching pulses having sufficient amplitudes can be supplied to switching transistors 15 and 16. Accordingly, the on-state resistances of these switching transistors 15 and 16 are not lowered even with low voltage, and thus the DC-DC converter 12 can be effectively operated.

The on-state period of the switching pulse can be varied using load fluctuation and input-voltage fluctuation; however, a variable range is restricted so as to stabilize the output voltage Vout of the DC-DC converter. Therefore, widening the range of the input voltage of the DC-DC converter which can be followed is restricted and widening the possible range of load fluctuation which can be followed is also restricted. In the secondary battery unit of the present invention, when the input voltage is lowered to a predetermined level, the inductor used in the DC-DC converter is switched from one having a larger inductance to one having a smaller inductance. This method can realize wider ranges of input voltage and load fluctuation, and thus a constant voltage can be output for a longer time with a simpler construction. In addition, the present secondary battery unit comprises means for operating the control circuit according to the output voltage of the DC-DC converter. This method is only effective for an application such as a secondary battery (such as the present invention) and in the case in which operation of the DC-DC converter is started from the higher voltage side.

As described above, with a simple construction, the control circuit can be operated with constant voltage Vout even if input voltage is lowered. Therefore, the on-state resistance of the switching transistor is not increased, and thus degradation of efficiency of the DC-DC converter can be prevented and charge of the electric double layer condenser can be used to the maximum.

Figure 4:
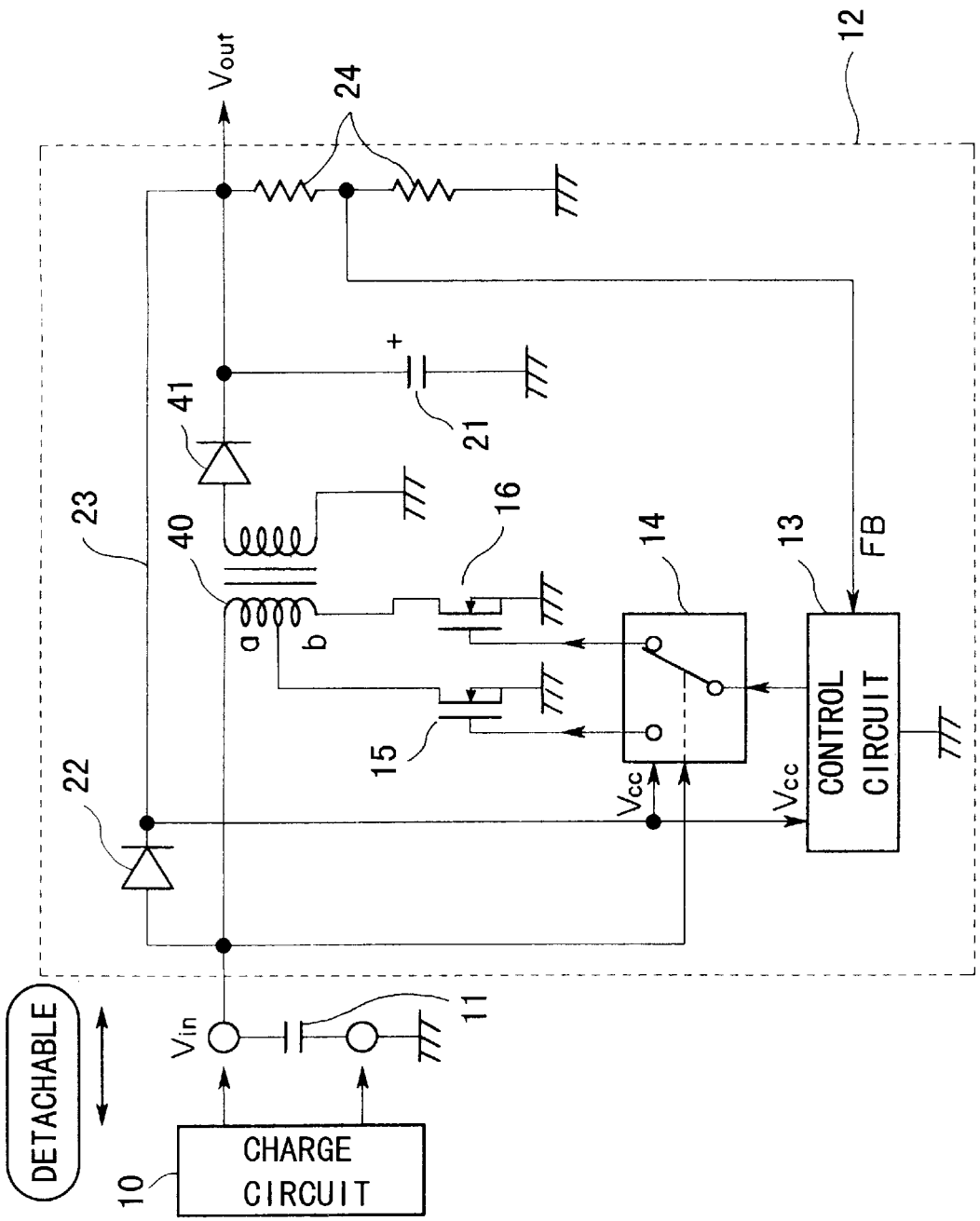
FIG. 4 is a block diagram showing the construction of a secondary battery unit as another embodiment according to the present invention.

FIG. 4 is a block diagram showing the structure of a secondary battery unit as another embodiment according to the present invention. This structure is obtained by applying the present invention to a flyback DC-DC converter. In the structure, pulses generated via the inductor of the primary winding of transformer 40 are extracted from the secondary winding. In FIG. 4, input voltage Vin is input into a terminal of the primary winding of transformer 40. Inductor-switching controller 14 is provided and connected so as to perform, as described in the above embodiment, switching operation between the first and second transistors 15 and 16 according to the input voltage Vin. That is, if the first switching transistor 15 is chosen, the center tap a of transformer 40 is used, and thereby construction of the boosting DC-DC converter 12 includes this switching transistor 15, diode 41, and smoothing condenser 21. If the second switching transistor 16 is chosen, the outside tap b of transformer 40 is used, and in this case, construction of the boosting DC-DC converter 12 includes the switching transistor 16, diode 41, and smoothing condenser 21.

Here, the number of turns with respect to the center tap a of transformer 40 is smaller than that of the outside tap b; thus, a higher boosting ratio is obtained by choosing the center tap a. The number of turns is different between the two taps; thus, inductance at the primary side is also different according to the tap chosen.

If the center tap a is chosen, then even with a low input voltage Vin of approximately DC 1V, a high boosting ratio is obtained, and thus a specific output can be obtained. If the outside tap b is chosen, the boosting ratio is lower. However, loss is also lower in this case, and thus higher efficiency can be realized than when using the center tap a.

Figure 5:
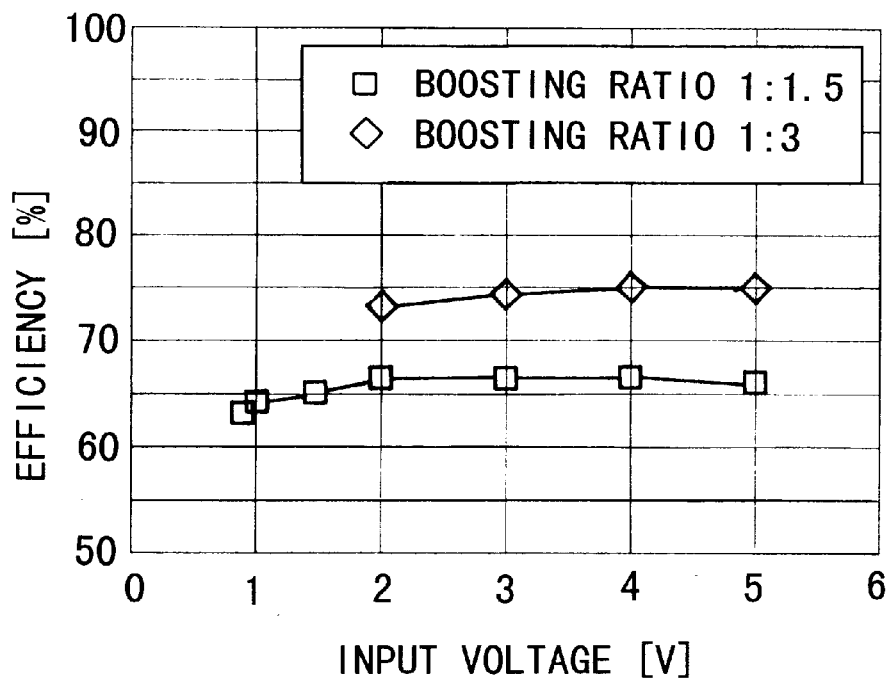
FIG. 5 is a graph showing relationships between efficiency and input voltage with respect to the secondary battery unit of FIG. 4.
Figure 6:
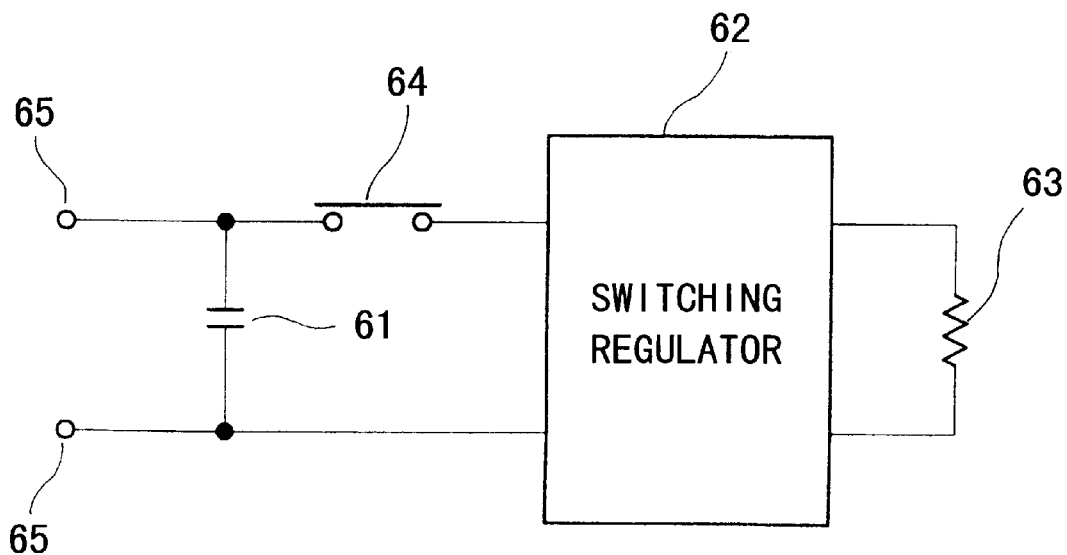
FIG. 6 is a block diagram showing the construction of a secondary battery unit as the first conventional example.
Figure 7:
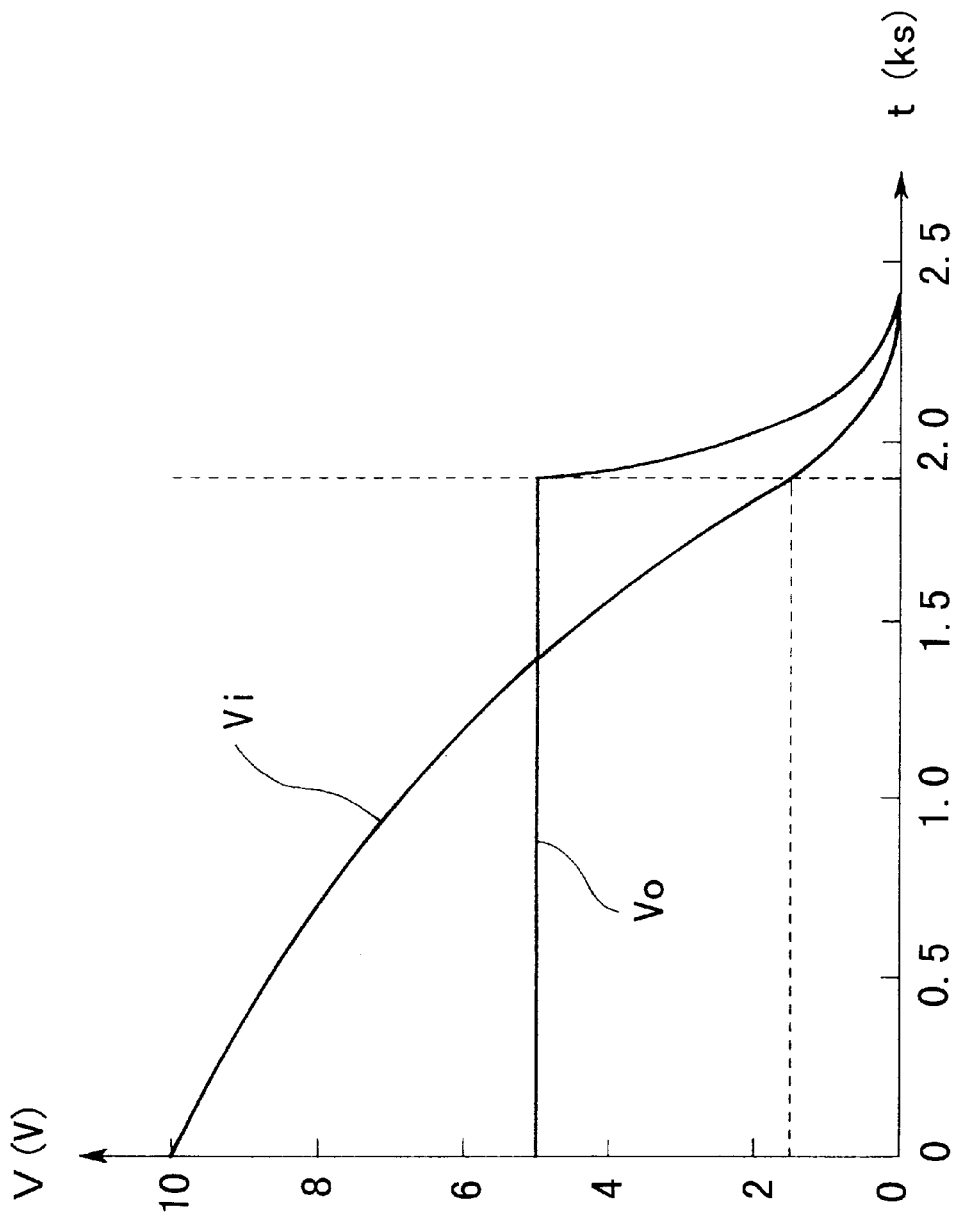
FIG. 7 shows temporal variations of the input voltage and the output voltage of the secondary battery unit of FIG. 6.
Figure 8:
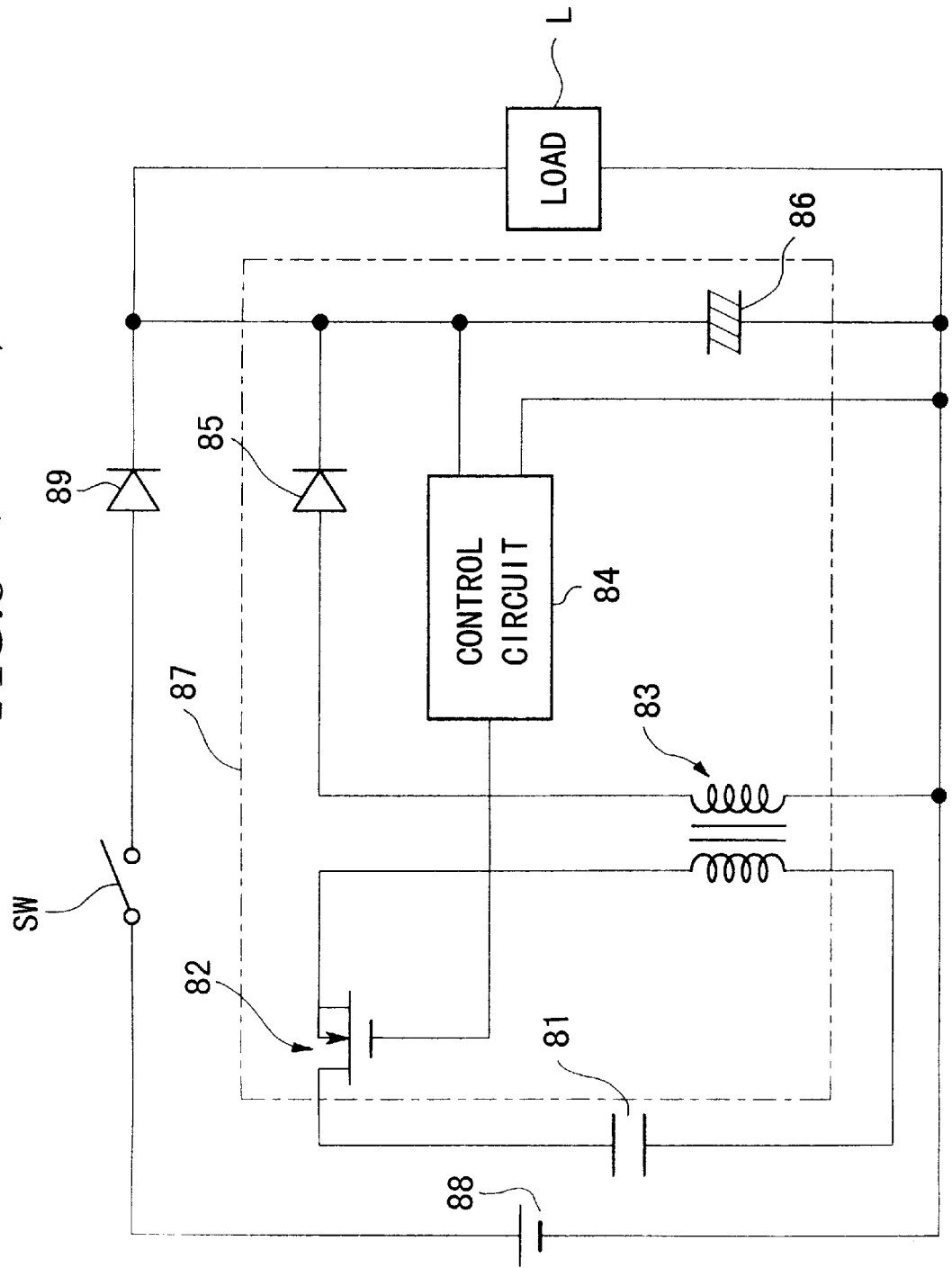
FIG. 8 is a block diagram showing the construction of a secondary battery unit as the second conventional example.
Figure 9:
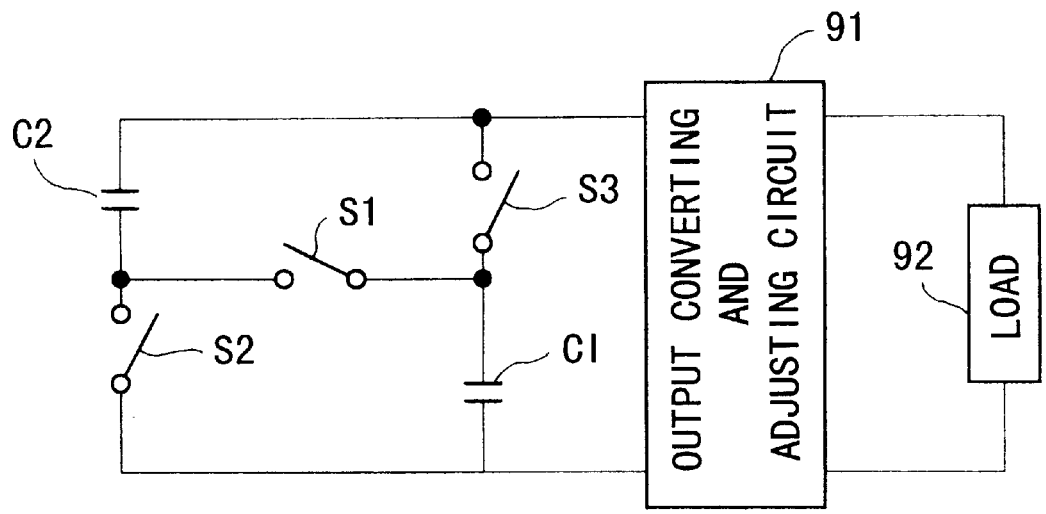
FIG. 9 is a block diagram showing the construction of a secondary battery unit as the third conventional example.
Figure 10:
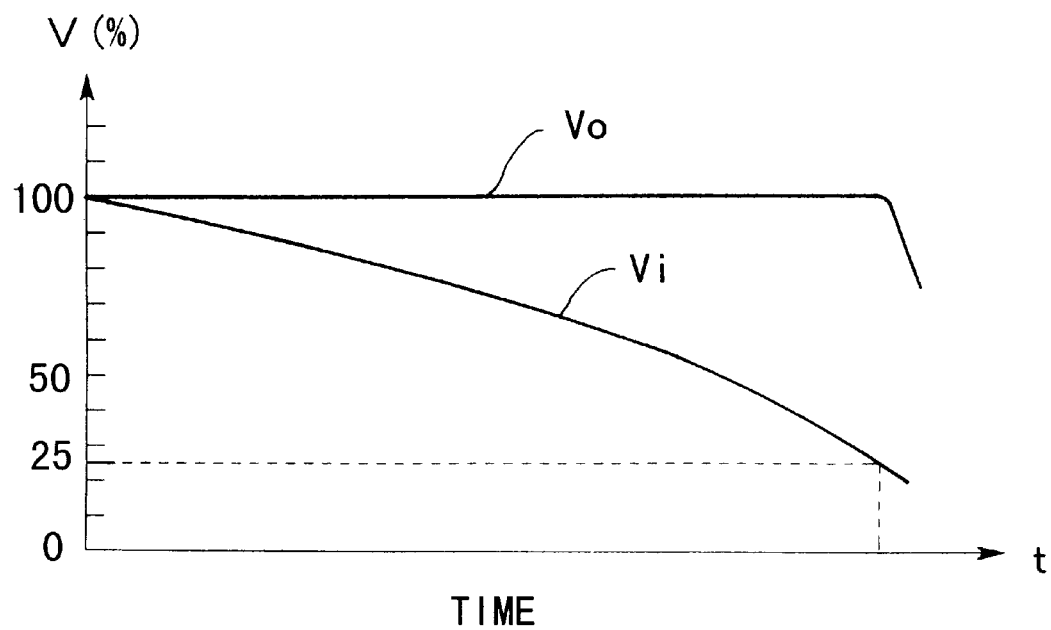
FIG. 10 shows temporal variations of the input voltage and the output voltage of the secondary battery unit of FIG. 9.
Figure 11:
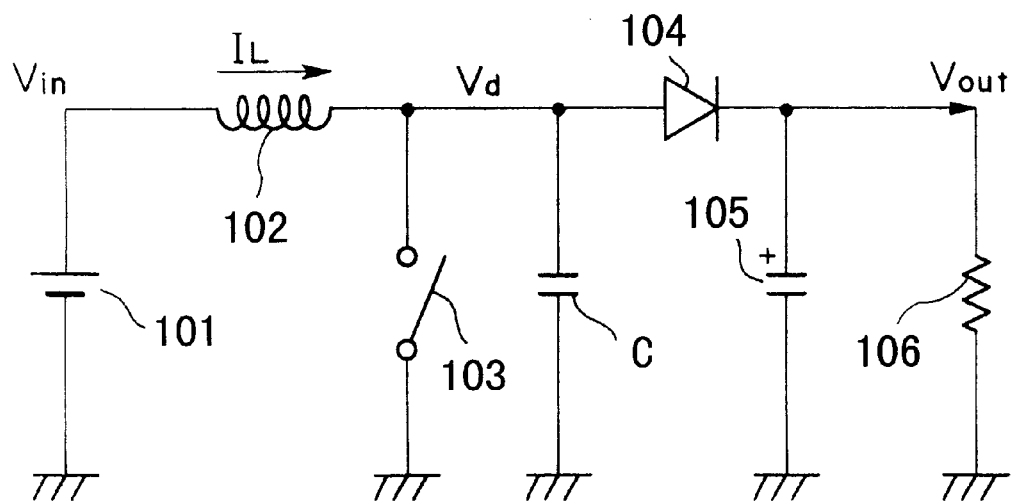
FIG. 11 is a block diagram showing the construction of a conventional DC-DC converter.
Figure 12A:
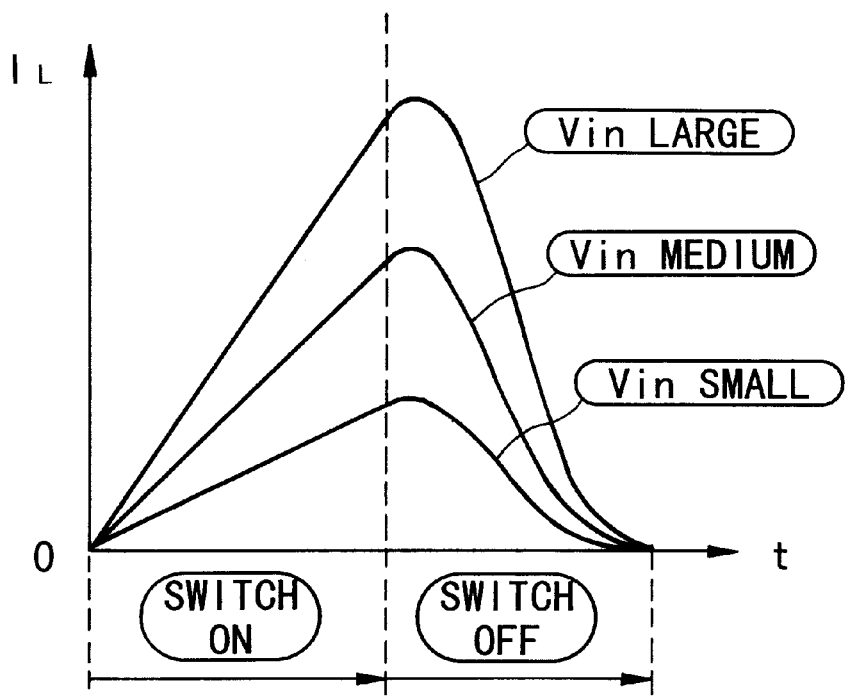
Figure 12B:
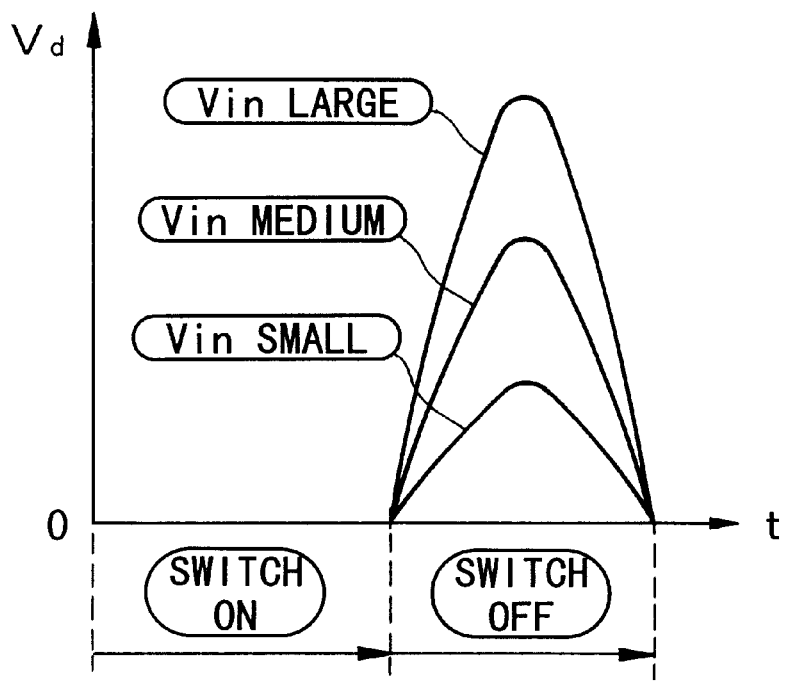
FIGS. 12B, 12D and 12E show relationships between the voltage-resonance wave form and time with respect to the conventional DC-DC converter.
Figure 12C:
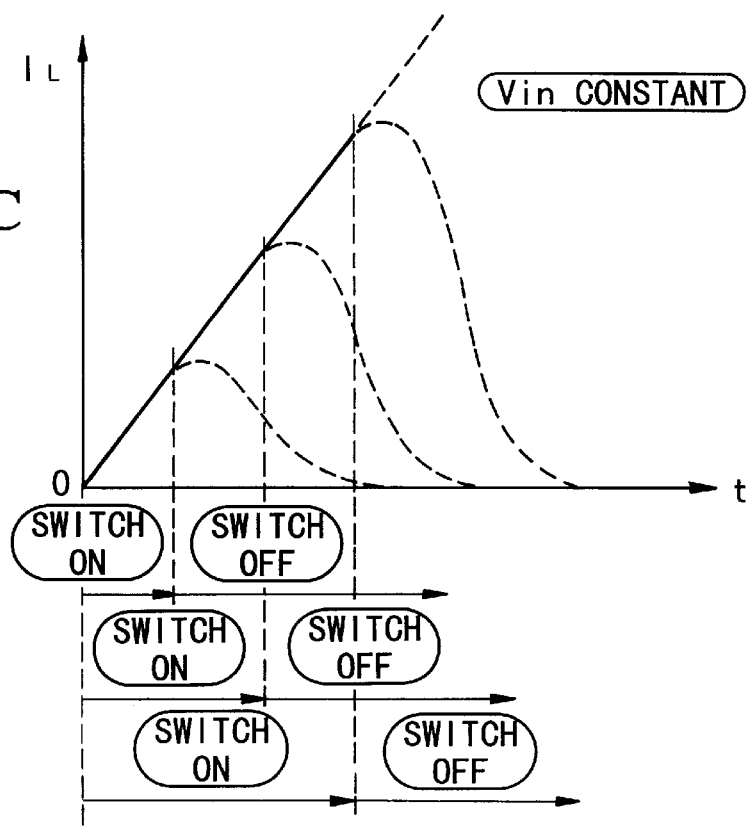
Figure 12D:
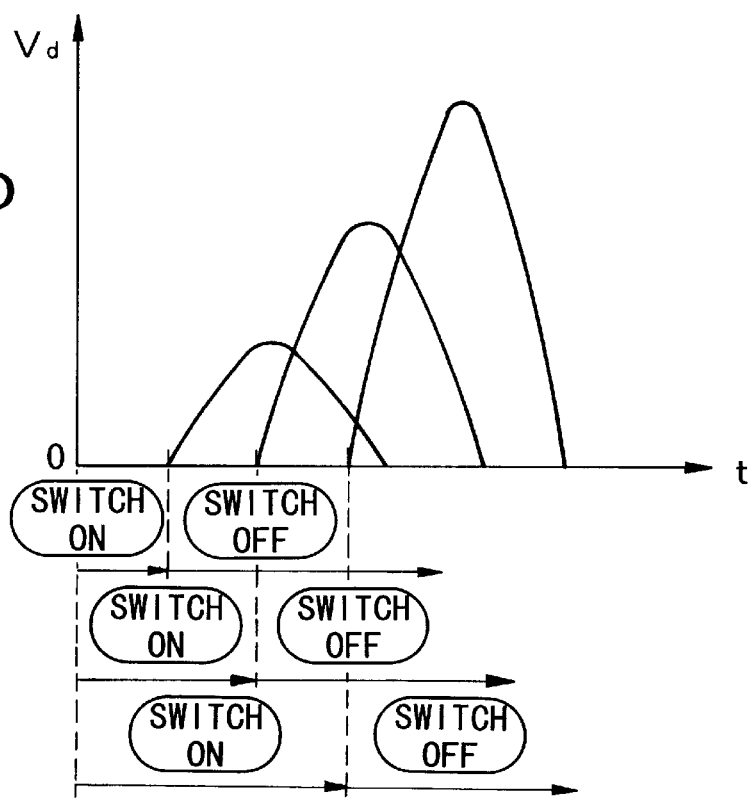
Figure 12E:
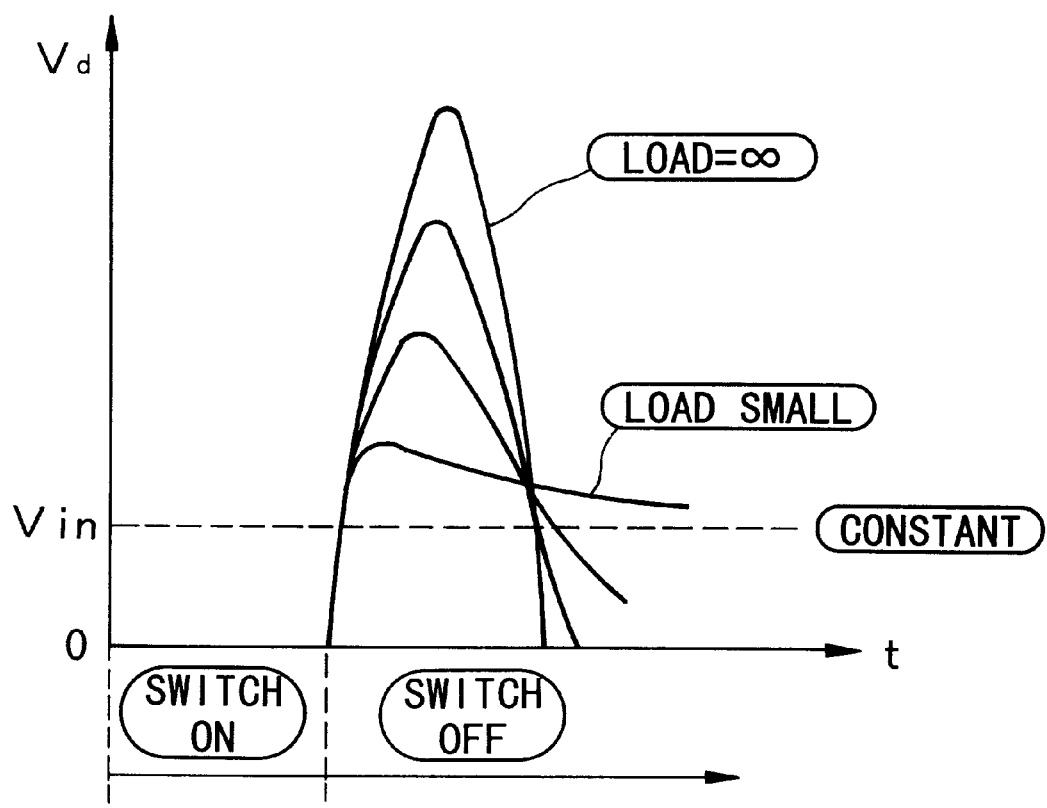
Figure 13A:
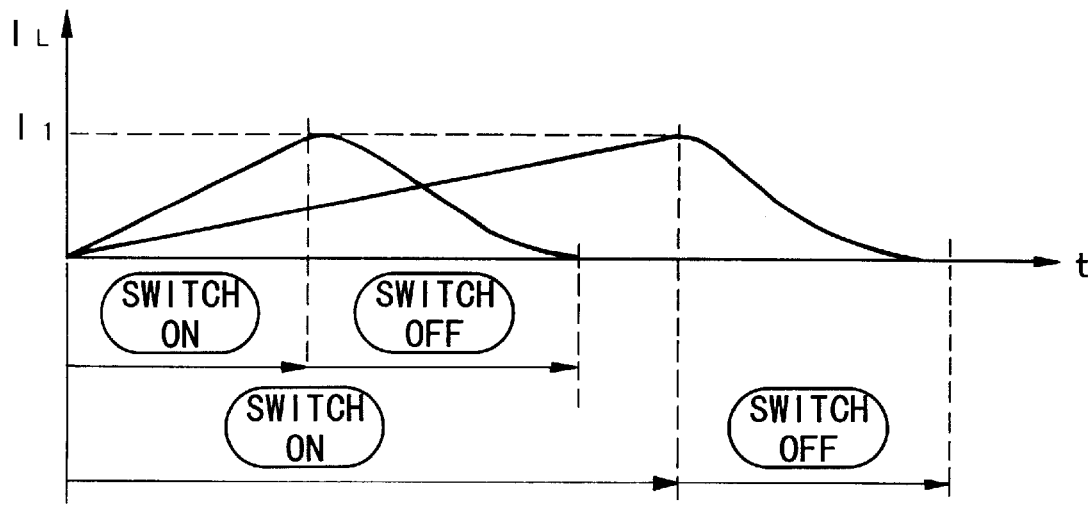
Figure 13B:
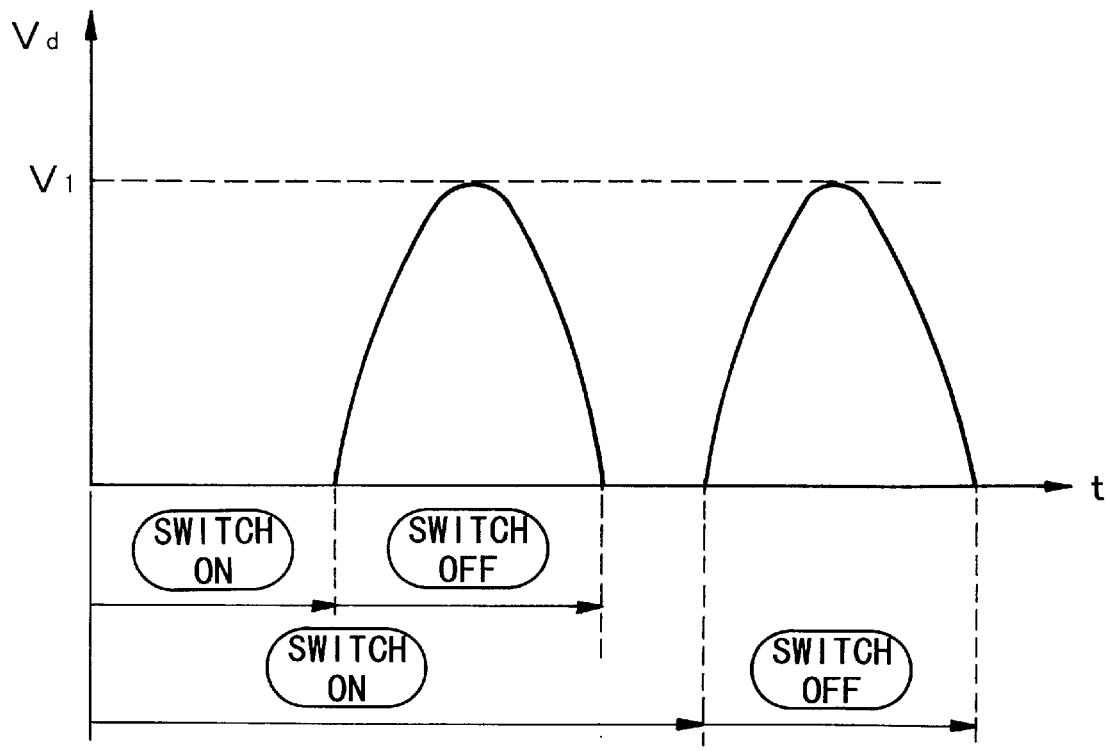
FIG. 13B shows the voltage-resonance wave form when the peak thereof is kept constant with respect to the conventional DC-DC converter.

FIG. 5 is a graph showing relationships between efficiency and input voltage in the first case of higher boosting ratio (1:15) and the second case of lower boosting ratio (1:3). According to the graph, in the case of lower boosting ratio, higher efficiency is generally obtained, but no output is obtained at the lower input voltage (less than 2 V). In the case of higher boosting ratio, efficiency is low but the unit is operable even with a low input voltage.

Accordingly, regarding this graph, if input voltage is higher than 2 V, it is desirable that the boosting ratio be lowered, while if input voltage is lower than 2 V, it is desirable that the boosting ratio be heightened so as to operate the secondary battery unit even with a low input voltage. Consequently, the energy stored in the electric double layer condenser 11 can be efficiently used to the utmost.

Also in the present embodiment, output voltage Vout is input into source terminal Vcc of control circuit 13 via feedback line 23. In this way, even if input voltage Vin is lowered, a boosted voltage is supplied to control circuit 13 and while output voltage Vout keeps a constant level, a desirable pulse amplitude of the switching transistor can be realized even with a lower input voltage. Therefore, the on-state resistance of the switching transistor is not increased and the efficiency of DC-DC converter 12 does not fall significantly; thus, energy stored in the electric double layer condenser 11 can be efficiently used.

What is claimed is:

1. A secondary battery unit for converting a first voltage to a predetermined second voltage and outputting the second voltage from an output terminal, the first voltage being a terminal voltage of an electric double layer condenser which is previously charged to have a predetermined voltage by using a detachable charge circuit, the unit comprising:

plural inductors having different inductances, to which the first voltage is input;

rectifying means inserted between the plural inductors and the output terminal;

plural switching means respectively connected to the plural inductors, each switching means making current according to the first voltage flow through the connected inductor when the switching means is operated;

switching control means for selectively operating one of the plural switching means according to variation of the first voltage; and a control circuit for controlling timing of the above switching between the plural switching means so as to stabilize a voltage from the output terminal to the predetermined second voltage.

2. A secondary battery unit as claimed in claim 1, wherein as the first voltage is gradually lowered from the higher side, the switching control means controls the plural switching means so as to switch one of the plural inductors having a larger inductance to another inductor having a smaller inductance.

3. A secondary battery unit as claimed in claim 1, wherein the control circuit is operated with the second voltage as a source voltage.

4. A secondary battery unit for converting a first voltage to a predetermined second voltage and outputting the second voltage from an output terminal, the first voltage being a terminal voltage of an electric double layer condenser which is previously charged to have a predetermined voltage by using a detachable charge circuit, the unit comprising:

a transformer having primary and secondary windings, the primary winding having plural taps for changing the number of turns of the primary winding, and the first voltage being input into the primary winding;

rectifying means inserted between the secondary winding of the transformer and the output terminal;

plural switching means respectively connected to the plural taps, each switching means making current according to the first voltage flow through the winding having the number of turns determined by the connected tap when the switching means is operated;

switching control means for selectively operating one of the plural switching means according to variation of the first voltage; and a control circuit for controlling timing of the above switching between the plural switching means so as to stabilize a voltage from the output terminal to the predetermined second voltage.

5. A secondary battery unit as claimed in claim 4, wherein as the first voltage is gradually lowered from the higher side, the switching control means controls the plural switching means so as to switch one of the plural taps corresponding to a larger number of turns to another tap corresponding to a smaller number of turns.

6. A secondary battery unit as claimed in claim 4, wherein the control circuit is operated with the second voltage as a source voltage.

* * * * *